June 5, 1956  D. WIKTOR  2,748,563
SINGLE BURNER TURBOJET ENGINE
Filed Aug. 21, 1953  2 Sheets-Sheet 1
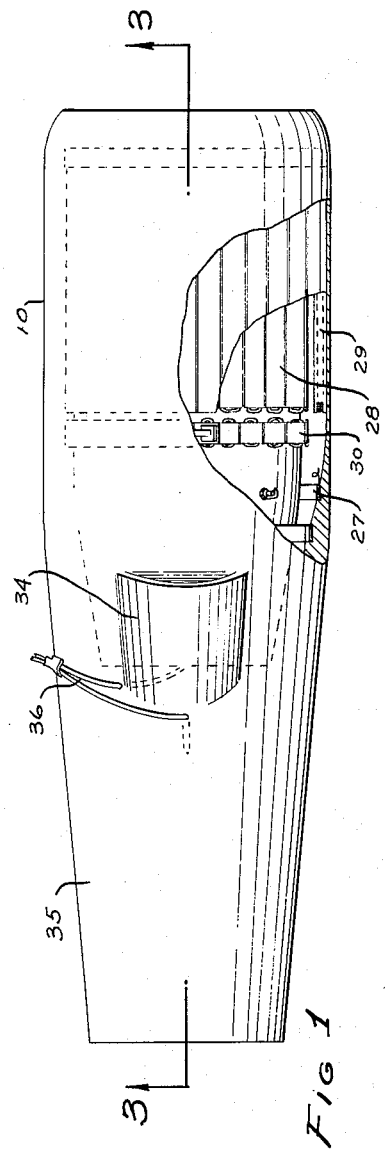
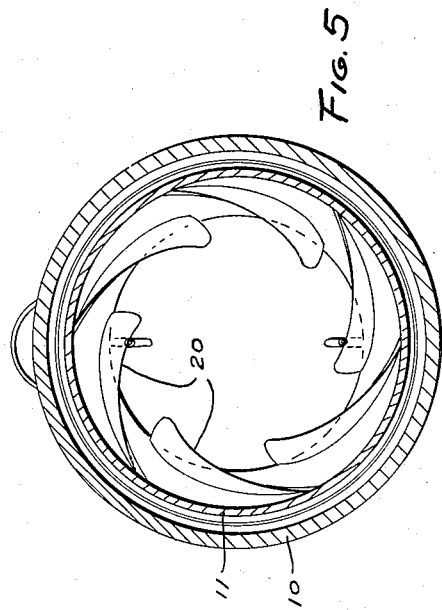
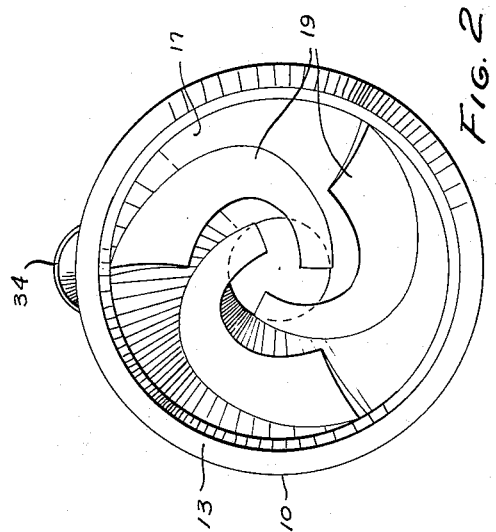
INVENTOR.
DOMINIK WIKTOR
BY
McMorrow, Berman & Davidson
ATTORNEYS June 5, 1956  D. WIKTOR  2,748,563
SINGLE BURNER TURBOJET ENGINE
Filed Aug. 21, 1953  2 Sheets-Sheet 2

INVENTOR.
DOMINIK WIKTOR
BY
McMorrow, Berman + Davidson
ATTORNEYS

United States Patent Office 2,748,563
Patented June 5, 1956

2,748,563

SINGLE BURNER TURBOJET ENGINE

Dominik Wiktor, Newark, N. J.

Application August 21, 1953, Serial No. 375,627

4 Claims. (Cl. 60—35.6)

This invention relates to turbojet engines and particularly to a turbojet engine having a single combustion chamber combined with the intake air compressor and the exhaust gas turbine of the engine.

It is among the objects of the invention to provide a turbojet engine suitable for aircraft propulsion which has a single, rotatable combustion chamber constituting the only important movable part of the engine; which utilizes the velocity energy of the rearwardly directed exhaust gases to rotate the combustion chamber and utilizes the rotation of the combustion chamber to compress the intake air and force it into the front end of the combustion chamber; which has a starting motor and electric generator surrounding the rotatable combustion chamber; which provides for the burning of all fuel internally of the engine thereby eliminating the usual plurality of fuel burners placed around the engine and greatly reducing the diameter, weight and complication of the engine; and which utilizes fully the ram effect of the forward of the engine and associated aircraft to increase the intake of combustion air by the engine.

Other objects and advantages will become apparent from a consideration of the following description and the appended claims in conjunction with the accompanying drawings wherein:

Figure 1 is a side elevational view of a jet engine illustrative of the invention with a portion of the engine broken away and shown in cross section to better illustrate the construction thereof;

Figure 2 is a front elevational view of the engine illustrated in Figure 1;

Figure 5 is a transverse cross sectional view on the line 5—5 of Figure 3.

Figures 3, 4:
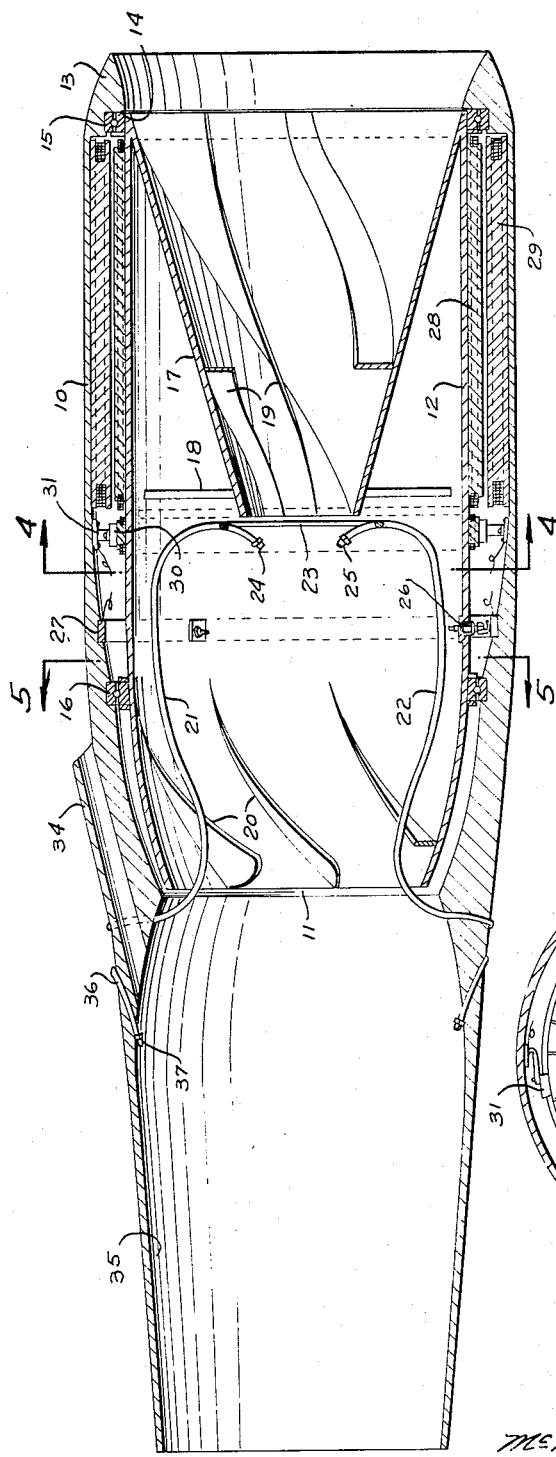
Figure 3 is a longitudinal cross sectional view on the line 3—3 of Figure 1.
Figure 4 is a transverse cross sectional view on the line 4—4 of Figure 3.

With continued reference to the drawings, the illustrated engine comprises an elongated tubular housing 10 which is preferably of circular cross sectional shape and has an open front end and an open rear end. Intermediate the length of the housing 10 the internal diameter of the housing is reduced to provide a restricted throat 11, the inner surface of the housing being concavely tapered in both directions to the throat 11 and the portion of the housing to the rear of the throat being rearwardly tapered and constituting the fixed discharge stack of the engine.

A tubular barrel 12 is disposed in and circumferentially spaced from the portion of the housing 10 between the front end of the housing and the throat 11, the forward portion of this barrel being substantially cylindrical, and the rear portion being concavely tapered to conform to the concave taper of the housing immediately forwardly of the throat 11. The wall thickness of the housing 10 is increased at the front end of the housing and forwardly tapered in thickness to provide an annular bead 13 surrounding the front end of the housing and providing internally of the housing an annular, radially disposed shoulder 14 which overlies the front end of the barrel 12. An antifriction ball bearing 15 is disposed in the front end of the housing against the shoulder 14 and journals the front end of the barrel 12 to support the front end of the barrel for free rotation in the housing, and a complementary antifriction bearing 16 surrounds the barrel 12 at the rear end of the cylindrical portion of the barrel and is mounted in the housing 10 to support the rear end of the barrel for free rotation in the housing.

A rearwardly tapering funnel 17 is coaxially disposed in the barrel 12 and has its front end joined to the front end of the barrel and its rear end disposed intermediate the length of the barrel and supported from the barrel by the radially disposed spokes 18. Vanes 19 are spirally arranged in the funnel 17 and project inwardly from the inner surface of the funnel to induce a flow of air rearwardly through the funnel when the funnel and the barrel 12 rotate, and to compress this intake air before being discharged from the smaller, rear end of the funnel. Barrel rotating vanes 20 are spirally arranged in the barrel near the rear end of the barrel and project inwardly from the inner surface of the barrel and these vanes, when subjected to the velocity energy of the rearwardly flowing exhaust gas of the engine, impart high speed rotation to the barrel 12 within the housing 10.

Fuel supply tubes 21 and 22 extend through the wall of the housing 10 adjacent the rear end of the barrel 12 and extend forwardly in the barrel substantially to the rear end of the funnel 17 where they are supported by a supporting ring 23 connected to all of the tubes. Rearwardly directed fuel nozzles, as indicated at 24 and 25, are provided on the forward ends of the tubes 21 and 22 and direct sprays of fuel into the stream of intake air issuing from the rear end of the funnel 17 into the rear portion of the barrel 12. Ignition means, such as the spark plugs 26, extend through the wall of the barrel rearwardly of the rear end of the funnel 17 and each of these spark plugs carries a brush which rubs against the inner surface of a conductor ring 27 mounted in the housing to supply electrical energy to the spark plugs.

A motor-generator rotor 28 is mounted on and extends around the forward portion of the barrel and a motor-generator stator 29 is mounted in the forward portion of the housing 10 in surrounding relationship to the rotor 28. Electric current is supplied to or led from the motor generator comprising the rotor and stator windings 28 and 29 through a slip ring 30 mounted on the barrel 12 and suitable brushes 31 mounted in the housing 10.

The motor-generator serves as a starting motor to initially rotate the barrel 12 and bring the barrel up to sufficient rotational speed to start a flow of air through the engine while the engine is being started, and serves as a generator to generate the electrical energy for accumulation when the barrel is gas driven by the vanes 20.

The housing is provided with one or more outwardly and forwardly inclined air scoops, as indicated at 34, opening into the discharge stack portion 35 of the housing immediately rearwardly of the waist 11, and supplementary fuel supply tubes 36 and nozzles 37 are provided in the discharge stack 35 rearwardly of the air scoops 34 to cause additional consumption of fuel in the discharge stack and thereby supplement the power of the engine, when necessary.

As the air is heated by the combustion of fuel therein in the combustion chamber adjacent the rear end of the funnel 17 the air is expanded and its rearward velocity greatly increased. As this rearwardly flowing air strikes the barrel rotating vanes 20, it acts reactively on these vanes to rotate the barrel 12 at high speed without material loss of velocity longitudinally of the engine, the reaction to the force imparted to the vanes 20 being effective mainly to cause the air to rotate or whirl in the discharge stack 35, which whirling of the exhaust gas does not cause any material loss of rearwardly directed energy or other undesirable effects.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims, are therefore, intended to be embraced therein.

What is claimed is:

1. A turbojet engine comprising an elongated cylindrical housing having open front and rear ends, a hollow cylindrical barrel disposed in said housing and extending from the front end to a location intermediate the length of the housing, the portion of said housing disposed rearwardly of said barrel constituting the gas discharge stack of the engine, antifriction bearing means supporting front and rear portions of said barrel in said housing for free rotation of the barrel in the housing, a rearwardly tapered air inlet funnel coaxially disposed in said barrel and extending from the front end of the barrel to a location intermediate the length thereof, air induction vanes disposed in said funnel and extending spirally around the inner surface of the funnel, barrel rotating vanes disposed in said barrel rearwardly of said funnel and extending spirally around the inner surface of said barrel, fuel supply means extending through the wall of said housing and forwardly from the rear end of said barrel and including fuel discharge nozzles disposed adjacent the rear end of said funnel, and fuel igniting means extending through the wall of said barrel intermediate the length of the barrel.

2. A turbojet engine comprising an elongated cylindrical housing having open front and rear ends, a hollow cylindrical barrel disposed in said housing and extending from the front end to a location intermediate the length of the housing, the portion of said housing disposed rearwardly of said barrel constituting the gas discharge stack of the engine, antifriction bearing means supporting front and rear portions of said barrel in said housing for free rotation of the barrel in the housing, a rearwardly tapered air inlet funnel coaxially disposed in said barrel and extending from the front end of the barrel to a location intermediate the length thereof, air induction vanes disposed in said funnel and extending spirally around the inner surface of the funnel, barrel rotating vanes disposed in said barrel rearwardly of said funnel and extending spirally around the inner surface of said barrel, fuel supply means extending through the wall of said housing and forwardly from the rear end of said barrel and including fuel discharge nozzles disposed adjacent the rear end of said funnel, fuel igniting means extending through the wall of said barrel intermediate the length of the barrel, an electric motor-generator rotor mounted on the outside of said barrel, and an electric motor generator stator mounted in said housing in surrounding relationship to said rotor, said motor-generator serving as a starting motor to initiate the rotation of said barrel in said housing and as a generator of electrical energy when said barrel is gas driven.

3. In a turbo-jet engine, an elongated tubular housing having open forward and rear ends, a reduced diameter interior throat in said housing located intermediate its ends, a barrel having a plain cylindrical forward portion located in said housing, said barrel having a forward end located at the forward end of the housing and a rear end terminating at said throat, said barrel having a rear end portion tapering to the diameter of said throat, front and rear bearing means acting between said housing and said barrel and rotatably supporting front and rear portions of the barrel in said housing, a tapered funnel in said barrel having a larger end secured to the forward end of the barrel and a smaller end terminating at a point intermediate the ends of the barrel, first spiral longitudinal vanes in said funnel, second spiral longitudinal vanes in said barrel rearwardly of said funnel, fuel supply means entering said housing and having discharge nozzles located in said barrel behind said funnel, means on the housing for igniting fuel present in the housing.

4. In a turbo-jet engine, an elongated tubular housing having open forward and rear ends, a reduced diameter interior throat in said housing located intermediate its ends, a barrel having a plain cylindrical forward portion located in said housing, said barrel having a forward end located at the forward end of the housing and a rear end terminating at said throat, said barrel having a rear end portion tapering to the diameter of said throat, front and rear bearing means acting between said housing and said barrel and rotatably supporting front and rear portions of the barrel in said housing, a tapered funnel in said barrel having a larger end secured to the forward end of the barrel and a smaller end terminating at a point intermediate the ends of the barrels, first spiral longitudinal vanes in said funnel, second spiral longitudinal vanes in said barrel rearwardly of said funnel, fuel supply means entering said housing and having discharge nozzles located in said barrel behind said funnel, means on the housing for igniting fuel present in the housing, and rearwardly and inwardly directed air scoops on and traversing said housing and opening into said housing rearwardly of said throat.

References Cited in the file of this patent

UNITED STATES PATENTS

| 2,514,874 | Kollsman | July 11, 1950 |
| 2,563,029 | Goddard | Aug. 7, 1951 |
| 2,575,682 | Price | Nov. 20, 1951 |